(12) United States Patent
Bergstedt

(10) Patent No.: US 6,750,886 B1
(45) Date of Patent: Jun. 15, 2004

(54) METHOD AND SOFTWARE FOR DISPLAYING INFORMATION ON A DISPLAY AREA OF A SCREEN OF AN ELECTRONIC DEVICE

(76) Inventor: Donald B. Bergstedt, 812 Kilbirnie Ct., Sunnyvale, CA (US) 94087

( * ) Notice: Subject to any disclaimer, the term of this patent is extended or adjusted under 35 U.S.C. 154(b) by 465 days.

(21) Appl. No.: 09/767,630

(22) Filed: Jan. 22, 2001

Related U.S. Application Data

(60) Provisional application No. 60/178,113, filed on Jan. 26, 2000.

(51) Int. Cl.[7] ................................................. G09G 5/00
(52) U.S. Cl. ........................................ 345/784; 345/688
(58) Field of Search ................................. 345/784, 785, 345/684, 973, 688, 786, 787, 589, 582, 772, 685; 715/501.1

(56) References Cited

U.S. PATENT DOCUMENTS

| | | | |
|---|---|---|---|
| 5,532,715 A | * 7/1996 | Bates et al. | ................ 345/684 |
| 5,689,287 A | * 11/1997 | Mackinlay et al. | ......... 345/427 |
| 6,476,831 B1 | * 11/2002 | Wirth et al. | ................. 345/784 |

\* cited by examiner

*Primary Examiner*—John Cabeca
*Assistant Examiner*—Blaine Basom
(74) *Attorney, Agent, or Firm*—Blakely, Sokoloff, Taylor & Zafman; Stephen M. De Klerk

(57) ABSTRACT

A method is provided for displaying information on a display area of a screen of an electronic device. An initial page of information is displayed on the display area. A signal is transmitted from a user interface device operated by a user. A subsequent page of information is displayed on the display area in response to the signal, including at least one previously displayed line on a previous page, but moved away from an edge of the display area, and at least one newly displayed line between the previously displayed plurality of lines and the edge. Automatically upon display of the subsequent page, a visual cue is displayed on the display area between the previously displayed plurality of lines and the newly displayed plurality of lines in a manner to enable a user to distinguish the previously displayed plurality of lines from the newly displayed plurality of lines.

32 Claims, 12 Drawing Sheets

METHOD AND SOFTWARE FOR DISPLAYING INFORMATION ON A DISPLAY AREA OF A SCREEN OF AN ELECTRONIC DEVICE

CROSS-REFERENCE TO RELATED APPLICATIONS

Priority is claimed from Provisional Application No. 60/178,113, filed on Jan. 26, 2000.

BACKGROUND OF THE INVENTION

1). Field of the Invention

This invention relates to a method and a program used for displaying information on a display area of a screen of an electronic device.

2). Discussion of Related Art

Computer monitors are used for the display of information or "content" in a window-type graphical user interface (GUI). The content can take the form of text, graphics, images, etc., examples of which are document files, file folder/directory lists, internet web pages (including those displayed within frames), spreadsheets, databases, digital photographs, drawings, pull-down menu lists, etc. Frequently the window is not large enough to display the entire contents of the file, folder, etc. In such cases, the user can view the additional "off-screen" information by using a mouse-controlled cursor to select and move (by dragging) a slider bar, clicking on up or down arrows to scroll one "line" (the amount of the "line" movement varies in different products and instances, but is always an amount less than one "page") at a time, or by clicking the mouse with the cursor positioned in the scroll bar but not on the slider bar (which moves the file or folder content up or down one "page" or window at a time).

The page up or page down operations (referred to herein as paging operations) can also be implemented by pressing the page up or page down keys on the keyboard. Paging and scrolling operations can be implemented horizontally as well as vertically. Paging and scrolling operations are also used to display information other than in a window-type GUI, such as on a handheld computer such as a personal digital assistant (PDA), in television display of information such as an electronic program guide or internet web pages, on internet appliances, and on a mobile telephone. Other means are also available or can be envisioned which accomplish the same result of moving previously off-screen content into the view of the window.

When there is less than one full window of information remaining, a page down operation moves the document or folder information up just enough to align the last line of information in the file/folder with the bottom of the window. A problem is that the user does not know where to continue reading or looking for information after the page up operation is completed.

Even when more than a full window of content remains "off-screen", the page up operation does not move the content up the complete distance of the window's height. However, computer program applications (Microsoft Word and Microsoft Internet Explorer, for example) vary substantially in the amount of window content that is reproduced in the window following the paging operation. It is difficult for users to adapt to the differing amounts of content replicated in various application programs, since they don't know how far from the top edge of the window to expect to find the content continuation.

SUMMARY OF THE INVENTION

A method is provided for displaying information on a display area of a screen of an electronic device. An initial page of information is displayed on the display area. A signal is transmitted from a user interface device operated by a user. A subsequent page of information is displayed on the display area in response to the signal, including a previously displayed plurality of lines on a previous page, but moved away from an edge of the display area, and a newly displayed plurality of lines between the previously displayed plurality of lines and the edge. Automatically upon display of the subsequent page, a visual cue is displayed on the display area between the previously displayed plurality of lines and the newly displayed plurality of lines in a manner to enable a user to distinguish the newly displayed plurality of lines from the previously displayed plurality of lines.

BRIEF DESCRIPTION OF THE DRAWINGS

The invention is further described by way of example with reference to the accompanying drawings wherein.

DETAILED DESCRIPTION OF THE INVENTION

This invention relates generally to the manner in which information is displayed on a display area of a screen of an electronic device such as, but not limited to, a desktop or laptop computer, a handheld computer such as a PDA, a television display such as an electronic program guide, or a mobile telephone having a processor and memory. A user is able to do multi-line scrolling by using a user interface device such as a keyboard, a mouse, a keypad, or a touch sensitive screen which generates a signal. A page of information is information displayed on the entire screen or on a portion of the screen, such as a "window". A subsequent page is displayed each time a signal is generated. Each subsequent page includes at least one line, in either rows or columns, of a previous page. To facilitate a user in distinguishing lines which were previously displayed on a previous page from lines that are newly displayed, a visual cue is displayed on the display area between the lines previously displayed and the newly displayed lines. In the example described the visual cue is displayed by graying out previously displayed lines.

Figure 1:
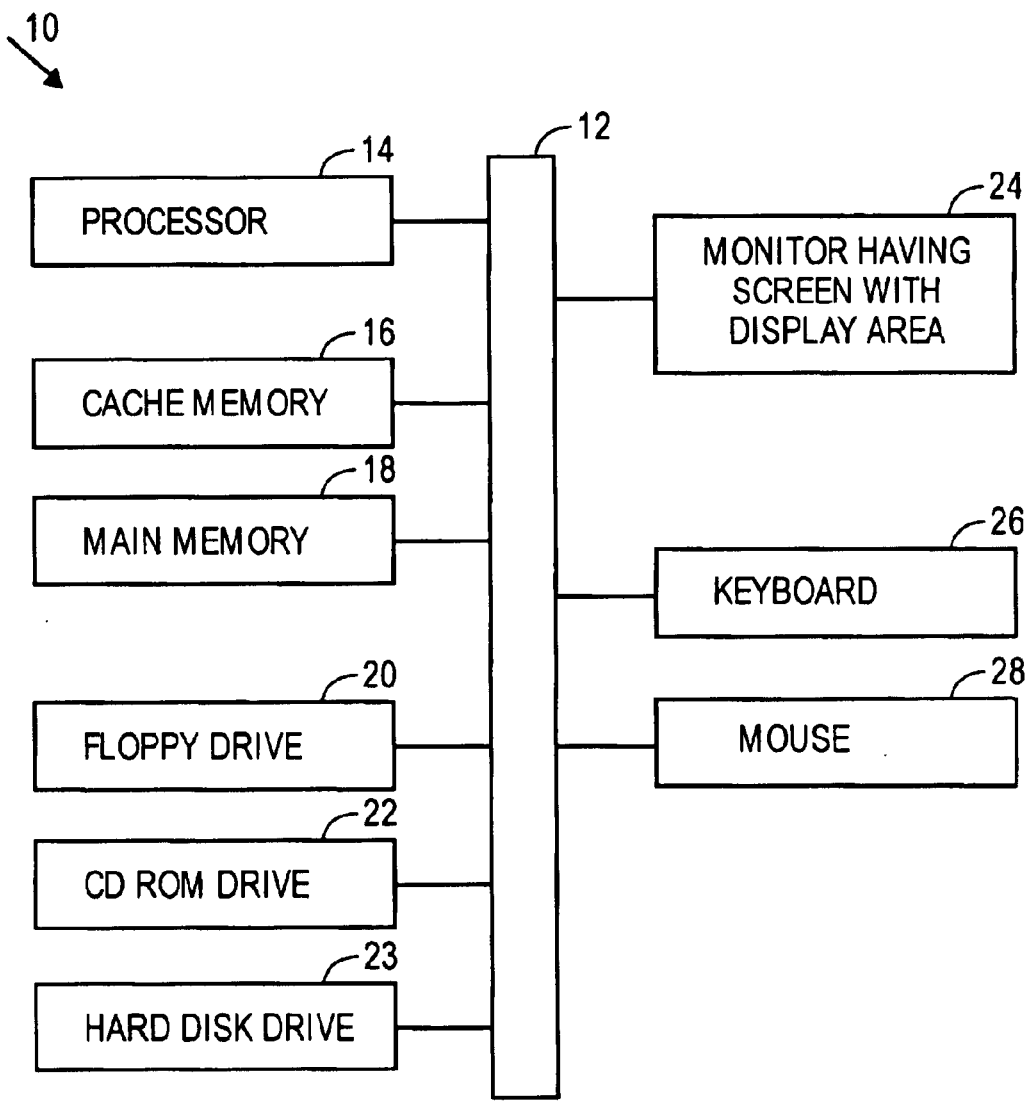
FIG. 1 is a block diagram of a computer which may be used in a method according to the invention.

FIG. 1 of the accompanying drawings illustrates a computer 10, such as a personal computer, which may be used for implementing the present invention. The computer 10 includes a bus 12 having connected thereto a processor 14, cache memory 16, main memory 18, a floppy drive 20, a compact disk Read-only-memory (CD ROM) Drive 22, a hard disk drive 23, a monitor 24 having a screen with a display area, a keyboard 26, and a mouse 28. A list of instructions in the form of a program can be stored on, for example, a compact disk and loaded in the CD ROM Drive 22. The instructions of the program can then be loaded into the cache memory 16 and the main memory 18 while more of the instructions may reside on the compact disk and on a hard disk of the hard disk drive 23. The floppy drive 20 or the hard disk drive 23 may be used instead of the CD ROM Drive 22 to load instructions into the computer. The instructions can be read by the processor 14 in a logical manner which ensures proper execution of the program. A user may interact utilizing the mouse 28 or the keyboard 26. A respective signal can be generated by the mouse 28 or the keyboard 26. The signal is sent through the bus 12 and ultimately to the processor 14 which responds to the signal to modify an execution of the program. As will be seen hereinbelow, execution of the program by the processor 14 results in control of how information, stored in the main memory 18, the cache memory 16, the hard disk drive 23, or the CD ROM Drive 22, is displayed on the display area of the monitor 24.

Figure 2:
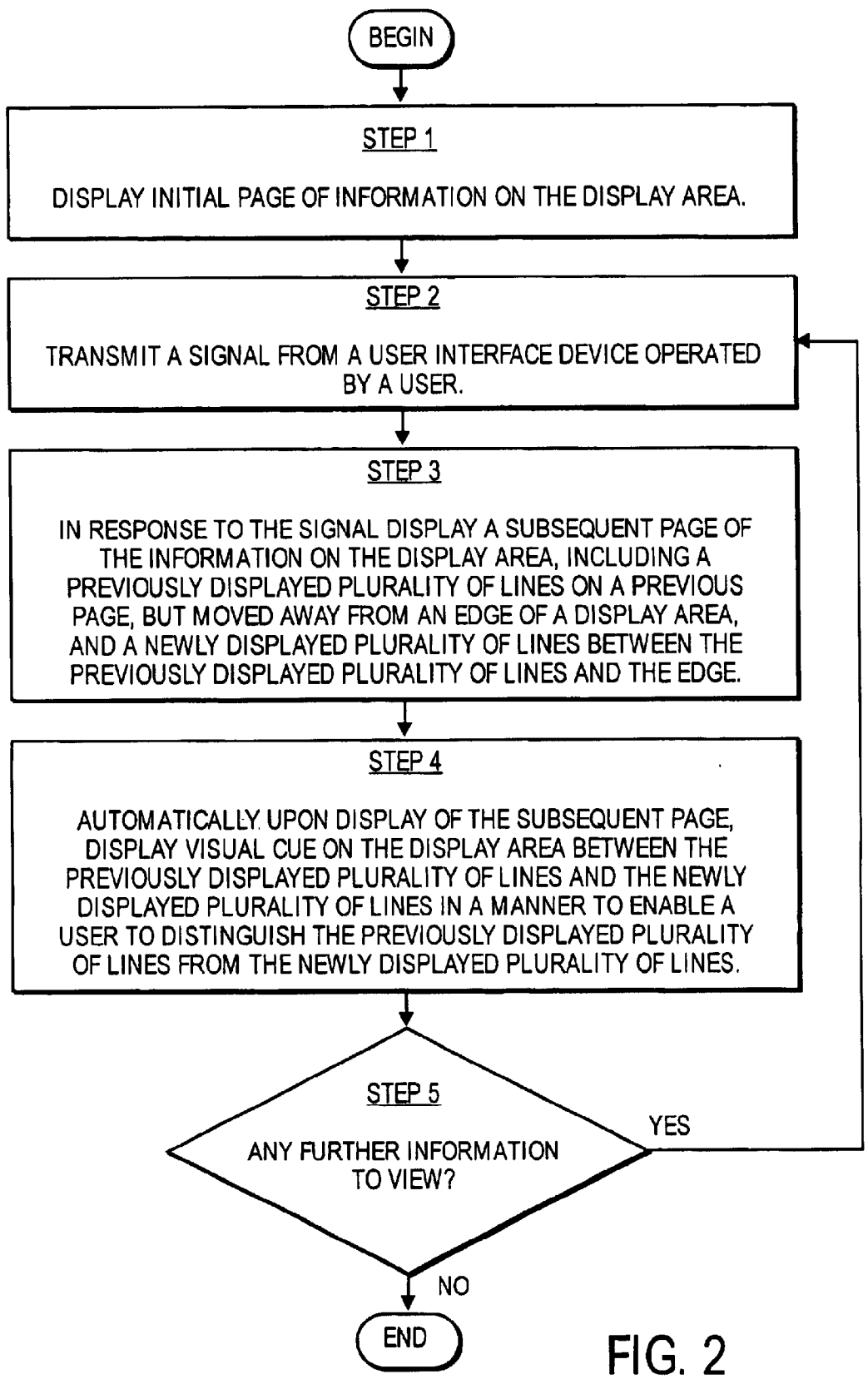
FIG. 2 is a flow chart illustrating the steps of the method of the invention.

FIG. 2 illustrates the basic steps of how the program is executed, and how a user interacts to control execution of the program.

In step 1, the initial page of information is displayed on the display area of the monitor.

In step 2, a user interacts with a user interface device such as a mouse or a keyboard which generates and transmits a signal from the user interface device operated by the user.

In step 3, a subsequent page is displayed on a display area in response to the signal. The subsequent page of information includes at least one previously displayed line which is previously displayed in step 1, but moved away from an edge of the display area. At least one newly displayed line is also displayed between the previously displayed plurality of lines and the edge.

In step 4, upon display of the subsequent page in step 3, a visual cue is automatically displayed on the display area between the previously displayed plurality of lines and the newly displayed plurality of lines. The visual cue is displayed in a manner to enable a user to distinguish the previously displayed plurality of lines from the newly displayed plurality of lines. A user is thereby able to distinguish lines which may have been read after step 1 is executed, but before step 2 is executed, from lines newly displayed when step 3 is executed. The visual cue draws the user's eyes to the correct point to continue reading, which increases the user's reading speed.

In step 5, a user determines whether there are more lines that are not displayed at step 4. Should additional lines not be displayed, and the user wishes to view such lines, the user again executes step 2 which, in step 3 displays a subsequent page. The subsequent page now displayed in step 3 includes a plurality of lines which were displayed when step 3 was first executed, and a newly displayed plurality of lines. Step 4 is then again executed on the page which is displayed when step 3 is again carried out. Steps 5, 2, 3, and 4 may again be executed, until the user determines at step 5 that there are no further lines to be viewed.

Figure 4A:
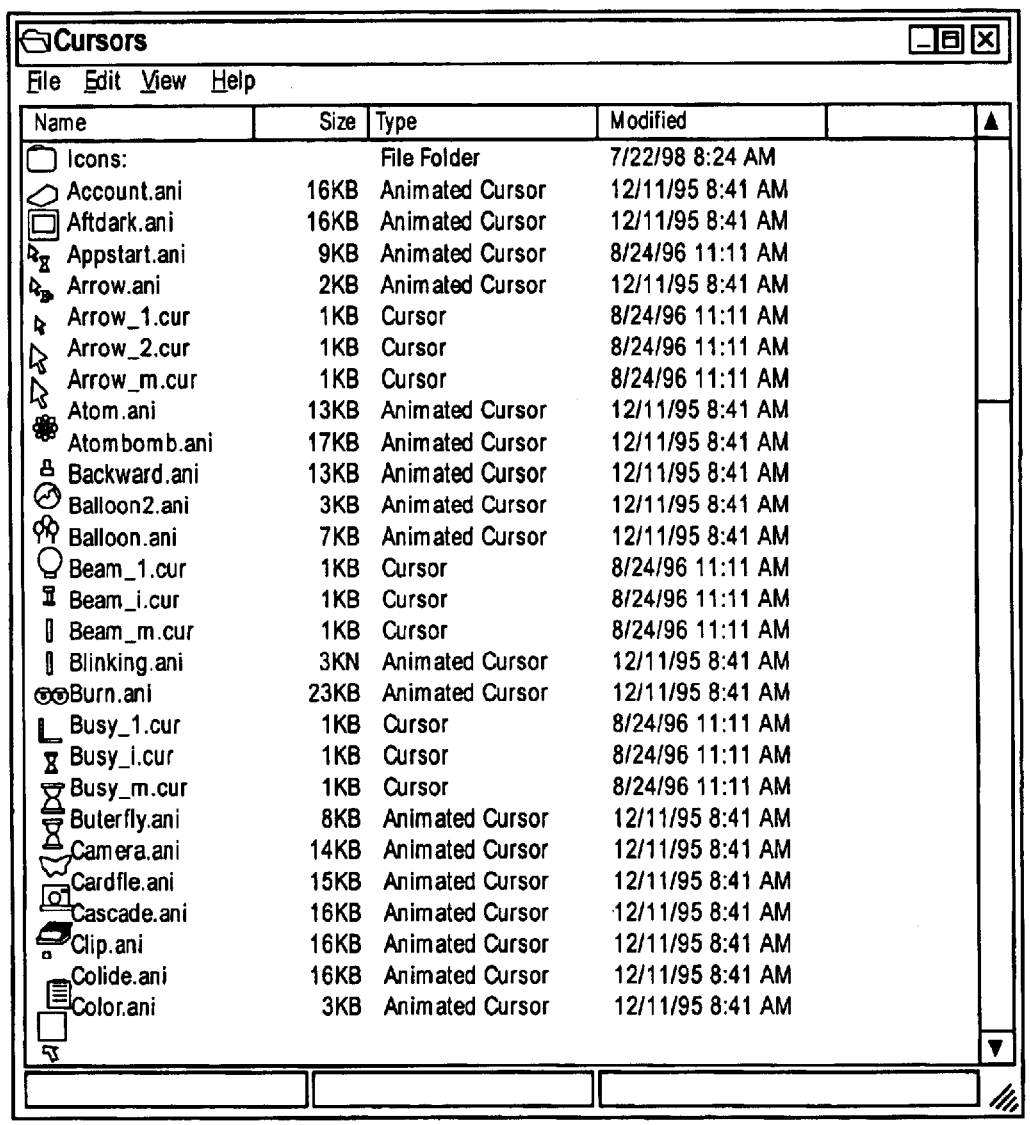
FIGS. 4a to 4d illustrate a software application for displaying a list of file names, according to an embodiment of the invention with vertical paging.
Figure 4B:
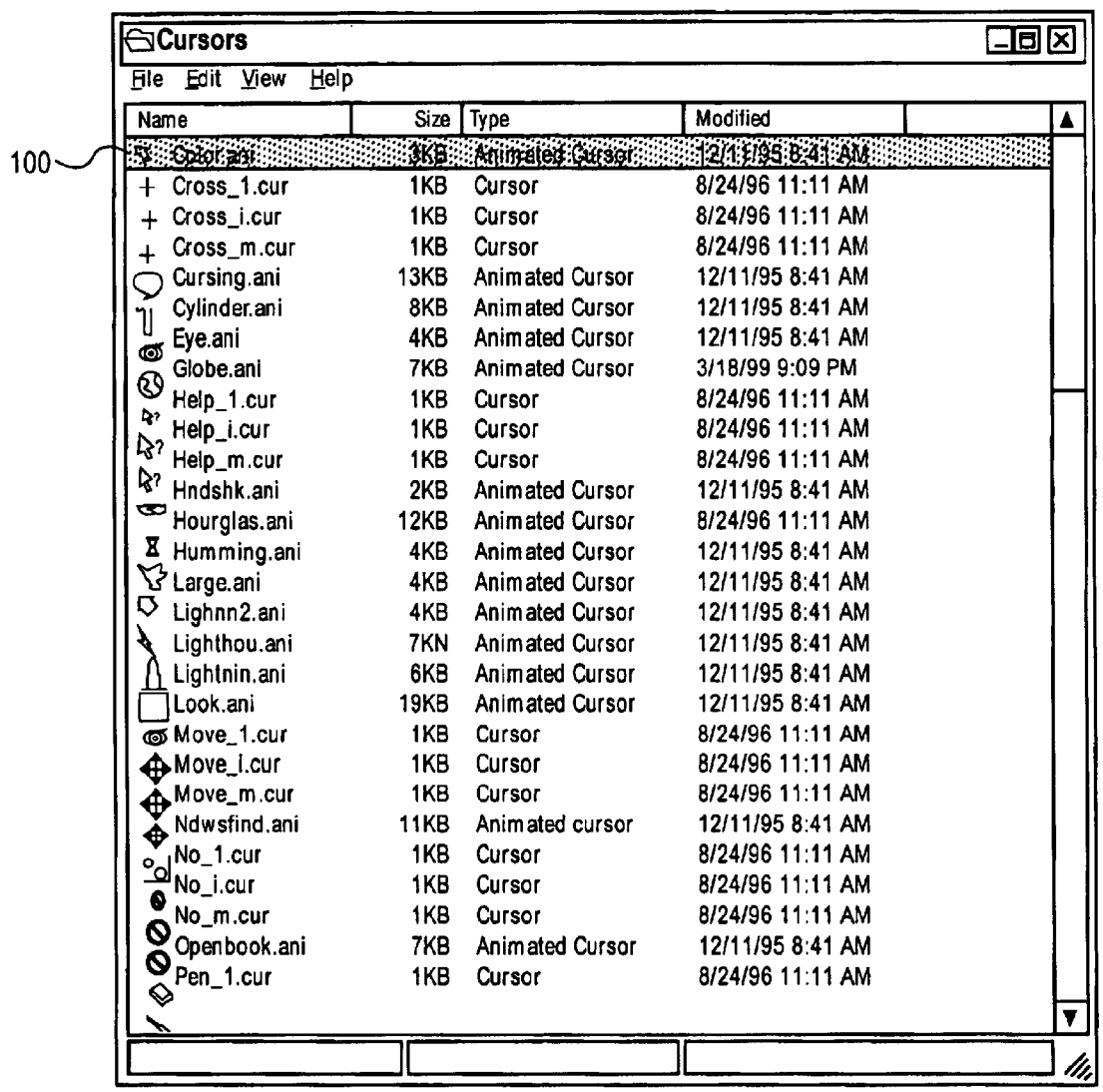
Figure 4C:
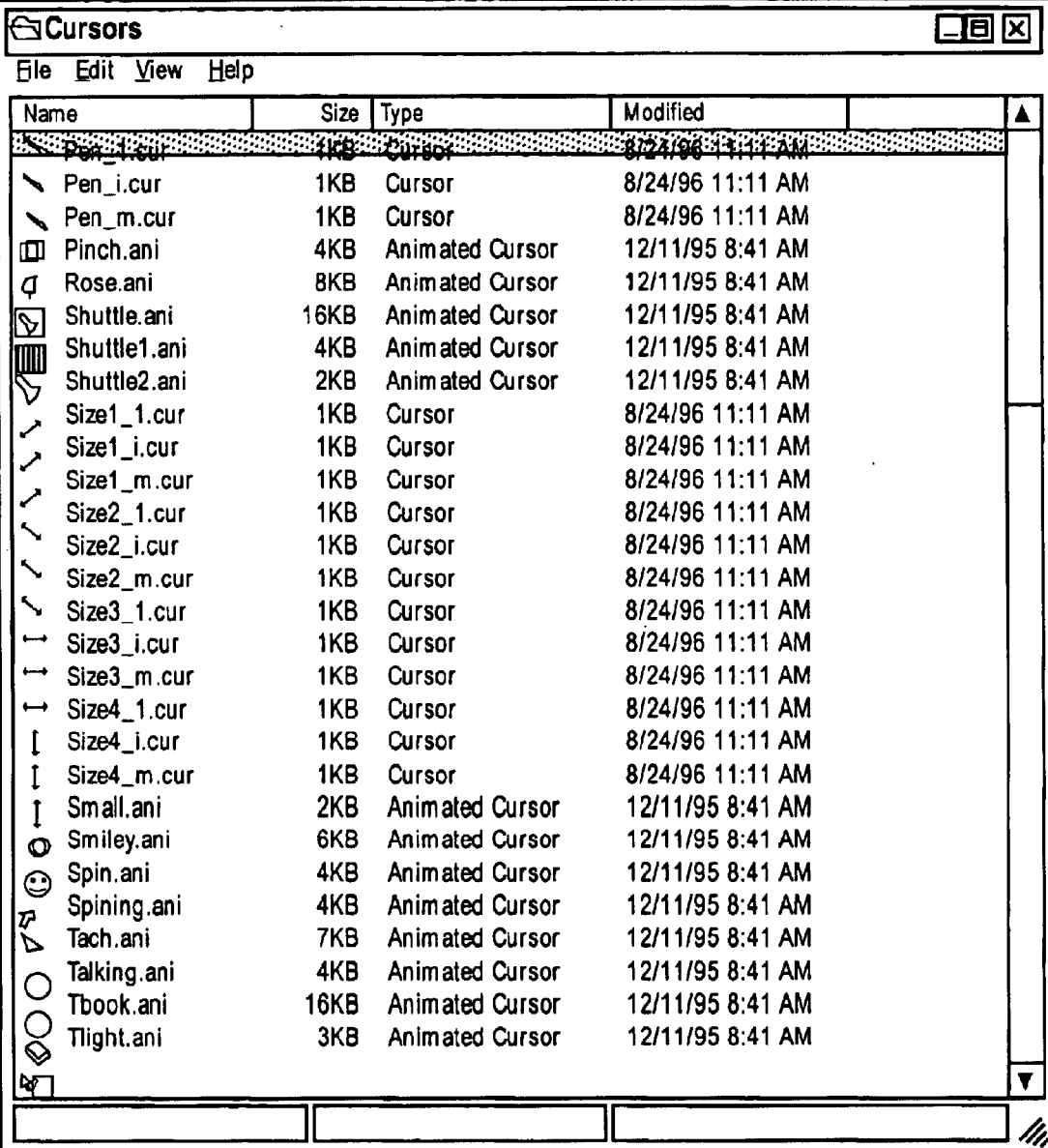
Figure 4D:
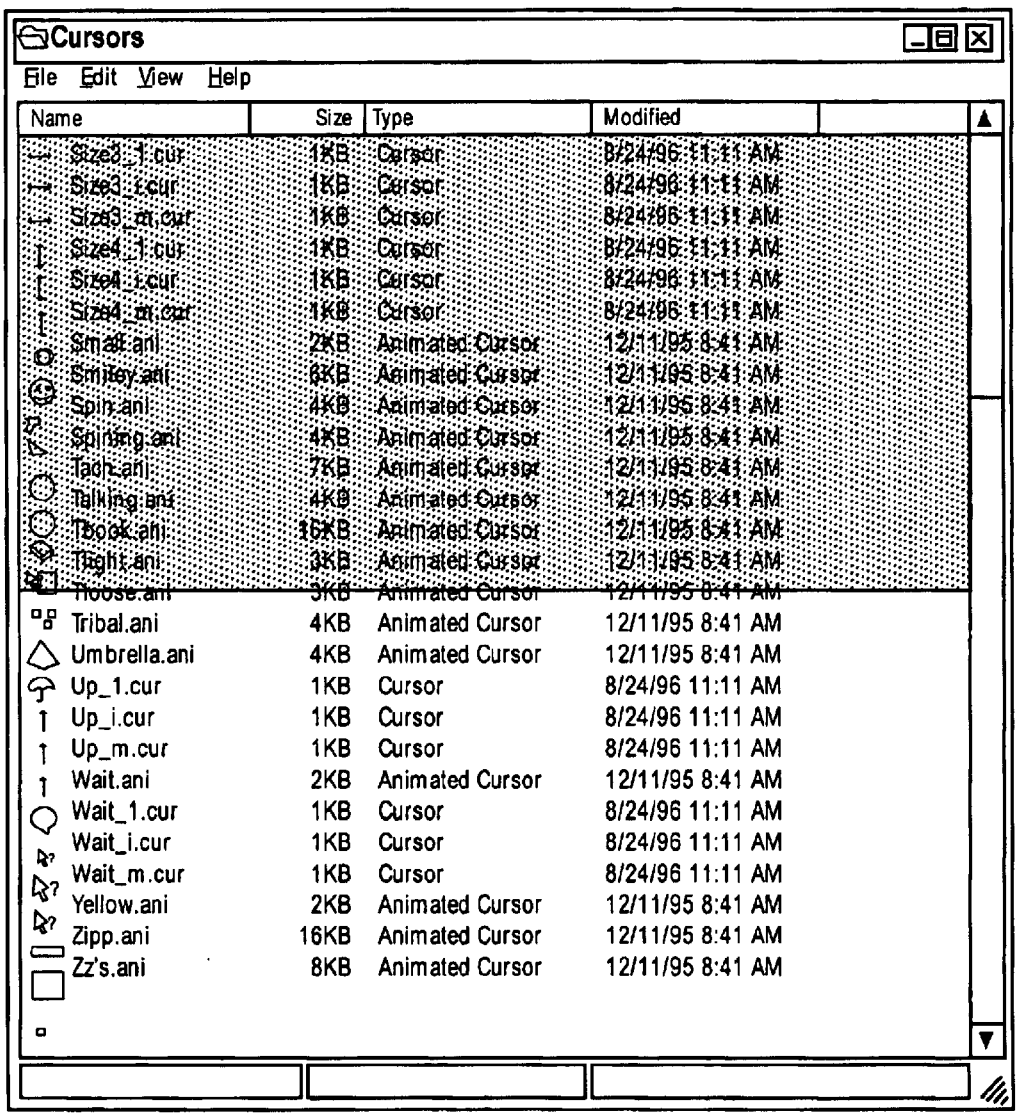
Figure 5A:
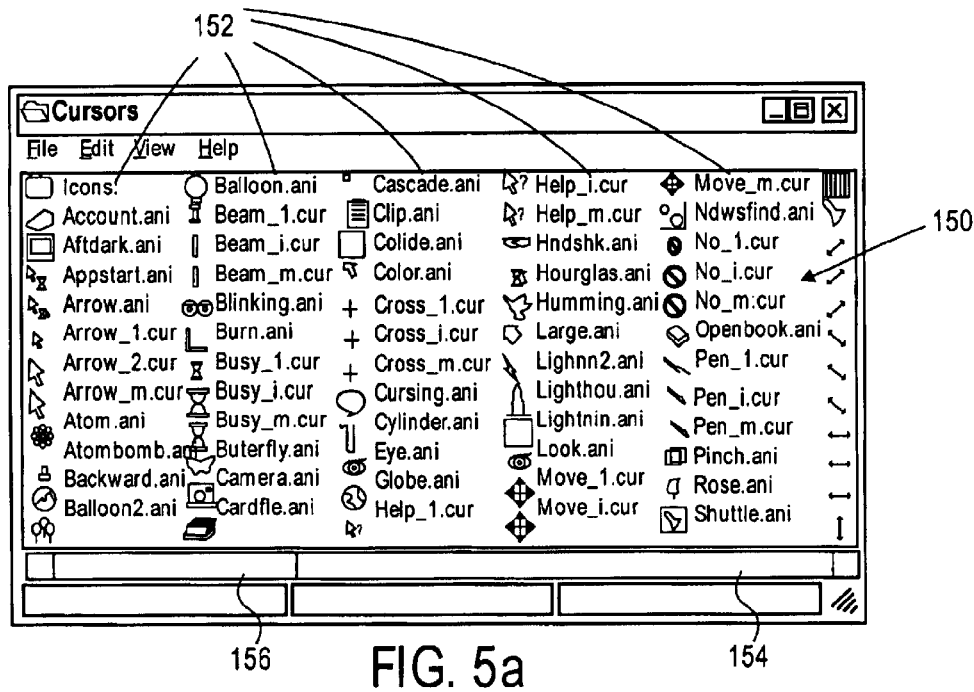
FIGS. 5a and 5b illustrate an application for displaying a list of file names according to another embodiment of the invention wherein the file names are listed in vertical columns located horizontally next to one another, with horizontal paging.
Figure 5B:
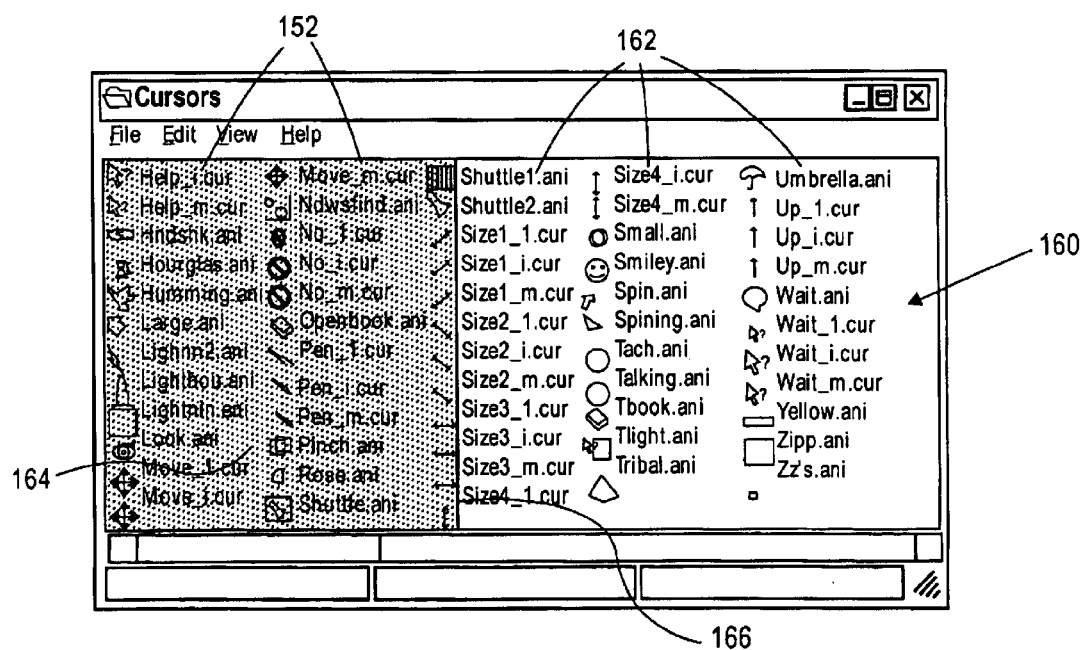

With these general concepts in mind, specific examples are now described with reference to FIGS. 3, 4, and 5.

Figure 3A:
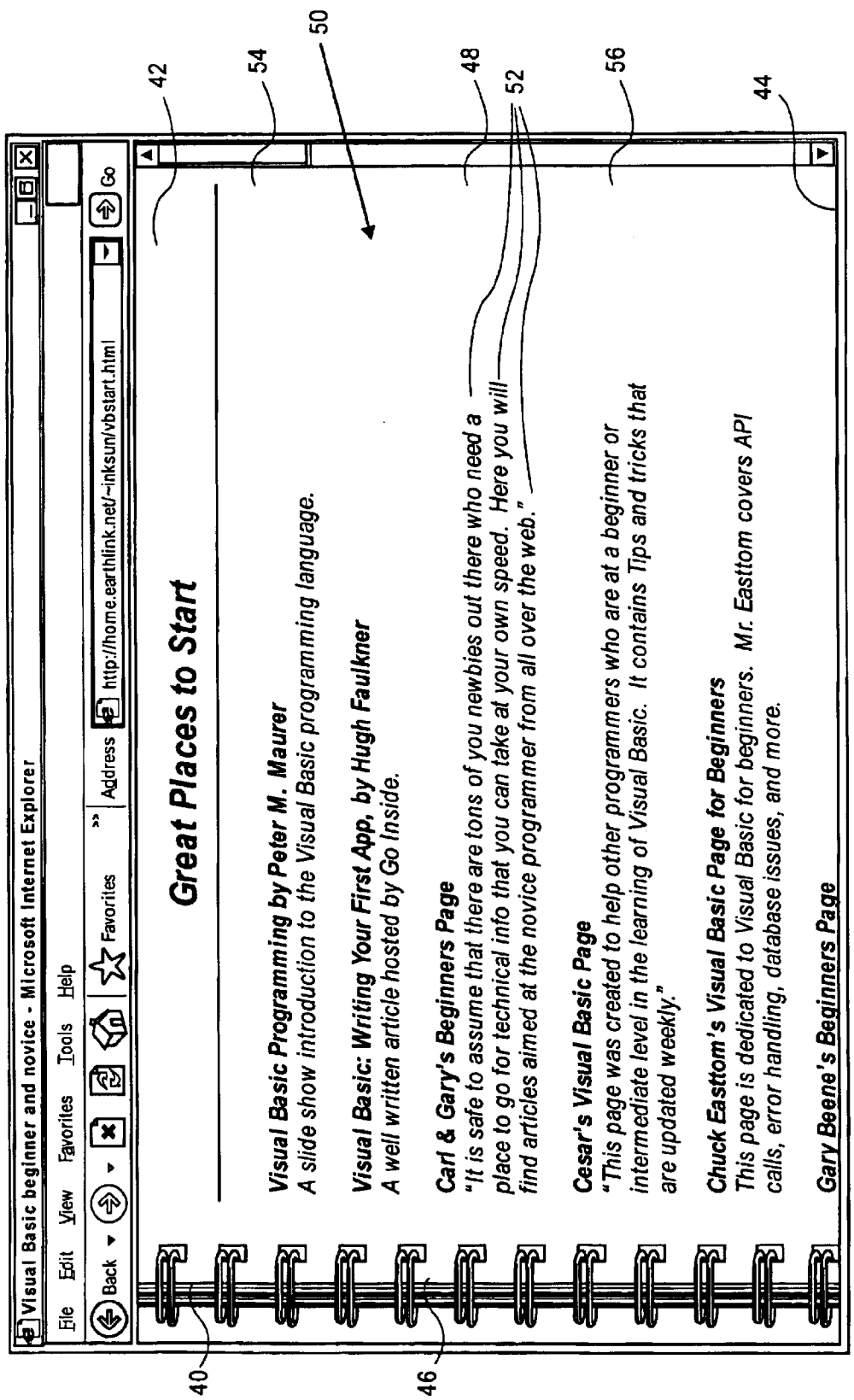
FIGS. 3a to 3e illustrate a browser application according to an embodiment of the invention.

Referring firstly to FIG. 3a, a window 40 is shown which is displayed on a display area of a computer screen. The window is defined by an upper edge 42, a lower edge 44, a left hand edge 46, and a right hand edge 48. A browser application is used which displays a page 50 (step 1). This page 50 includes multiple horizontal lines 52 located below one another.

A scroll bar 56 with a slider bar 54 is displayed. A user may utilize a mouse to move a cursor over the window 40, and buttons on the mouse to click on a selected location of the cursor. By clicking on a paging area or the scroll bar 56 below the slider bar 54, a following page can be displayed (step 2).

Figure 3B:
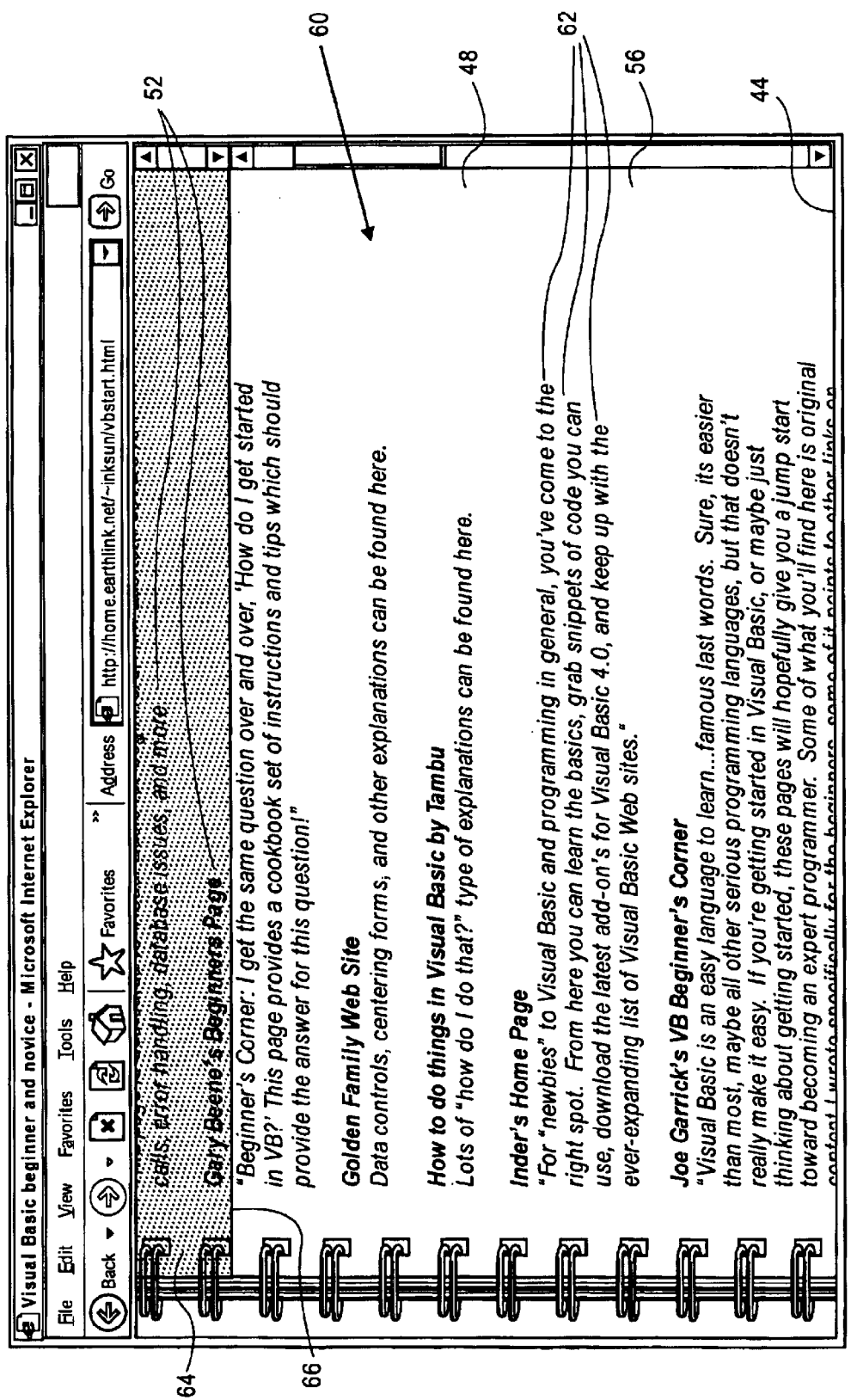

FIG. 3b illustrates a following page 60 which is displayed upon clicking on the area 56 when the page 50 of FIG. 3a is displayed. The page 60 includes some of the lines 52 previously displayed on the page 50 of FIG. 3a, and a plurality of lines 62 which are newly displayed. The lines 52 displayed on the page 60 are moved relative to a position on the page 50 of FIG. 3a so that a lowest line of the lines 52 is moved upwardly away from the lower edge 44.

The lines 52 are covered by a grayed out mask 64 whereas the lines 62 are not covered by any grayed out mask (step 4). The grayed out mask 64 may for example change the color of all lettering from a darker shade to a lighter shade, such as from black to gray. Alternatively white areas between lettering can be given a color such as gray. The grayed out mask 64 has a lower edge 66 located between the lowest one of the lines 52 and the highest one of the lines 62. Should a user already have read the lines 52 on the page 50 of FIG. 3a, the user, when viewing the page 60 of FIG. 3b, would be able to distinguish the lines 52 which have already been read from the lines 62 which still have to be read, due to a different pattern of the mask 64 covering the lines 52 from the pattern provided due to lack of a mask over the lines 62. The grayed out mask 64 is preferably displayed for a discrete amount of time, e.g. for about 1 second, whereafter it is removed. The amount of time is preferably between 0.5 and 2 seconds. In another embodiment a line may be drawn between the lines 52 and the lines 62 or an arrow may point to a last of lines 52, a first of lines 62 or may point to between a list of lines 52 and a first of lines 62. Other means of providing a visual cue to differentiate the lines 52 and the lines 62 may occur to those ordinarily skilled in the art such as a photo-negative effect, making one portion of the plurality of lines disappear, and reappear, changing colors, or making the previously displayed portion less visible.

Figure 3C:
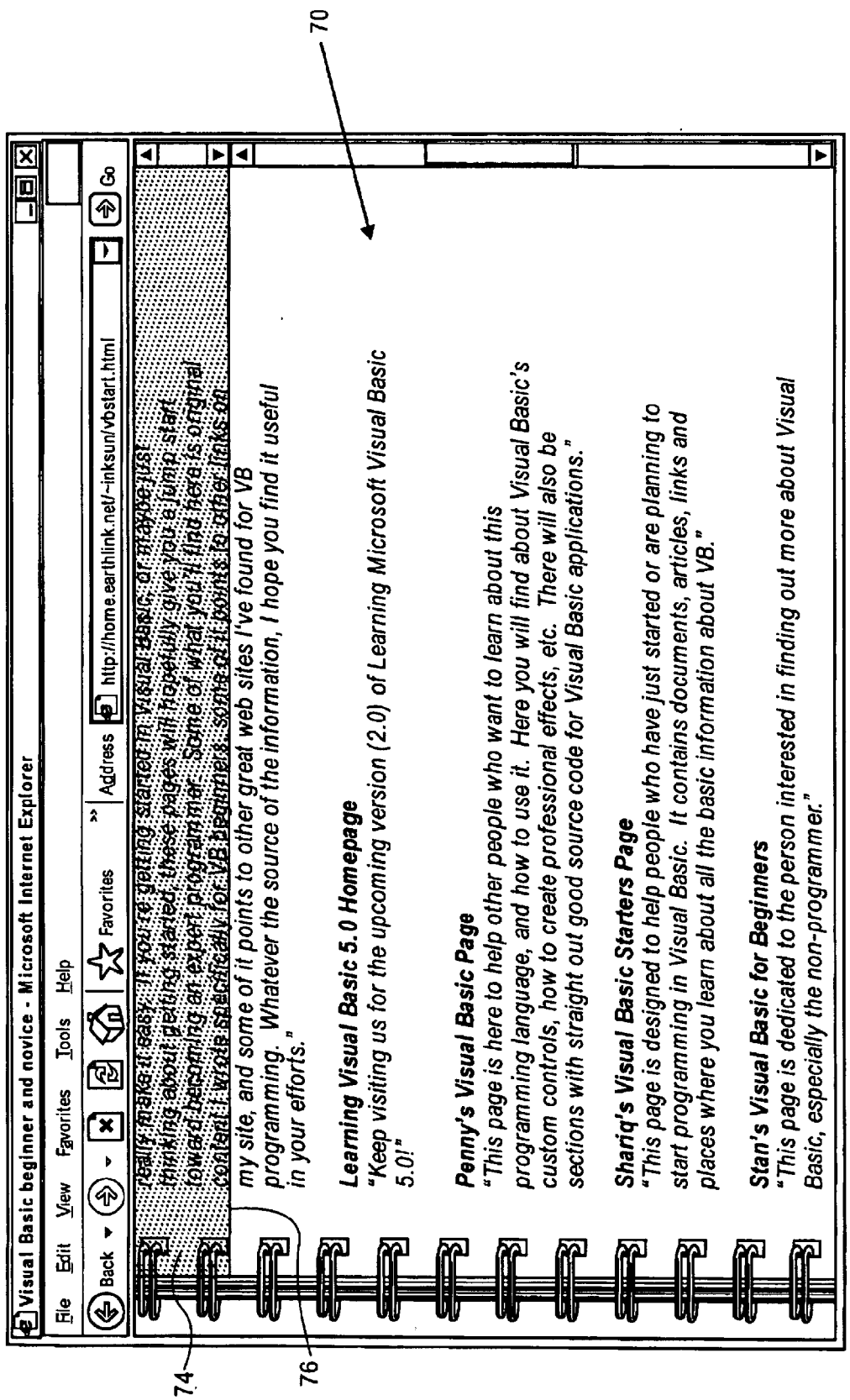
Figure 3D:
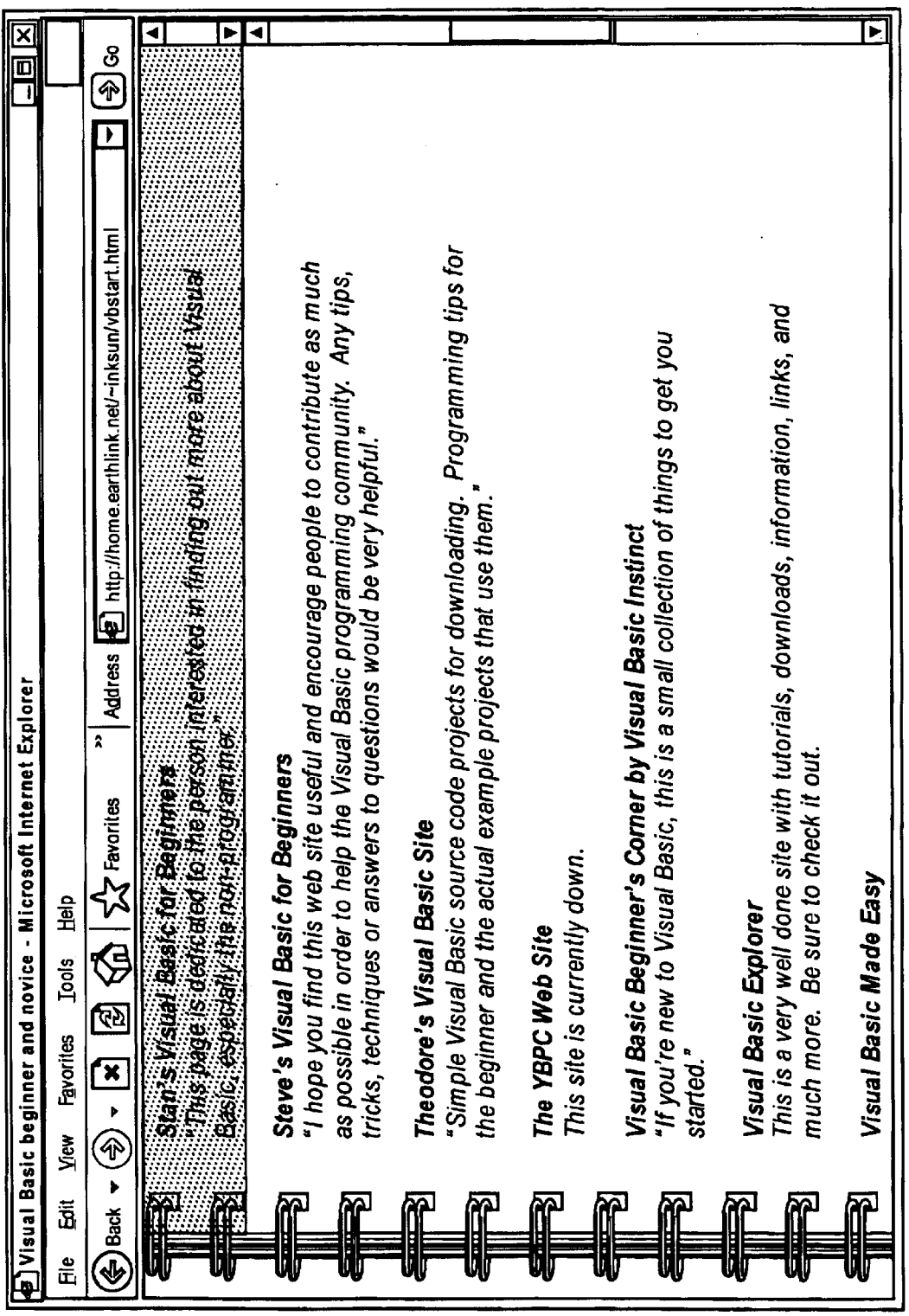
Figure 3E:
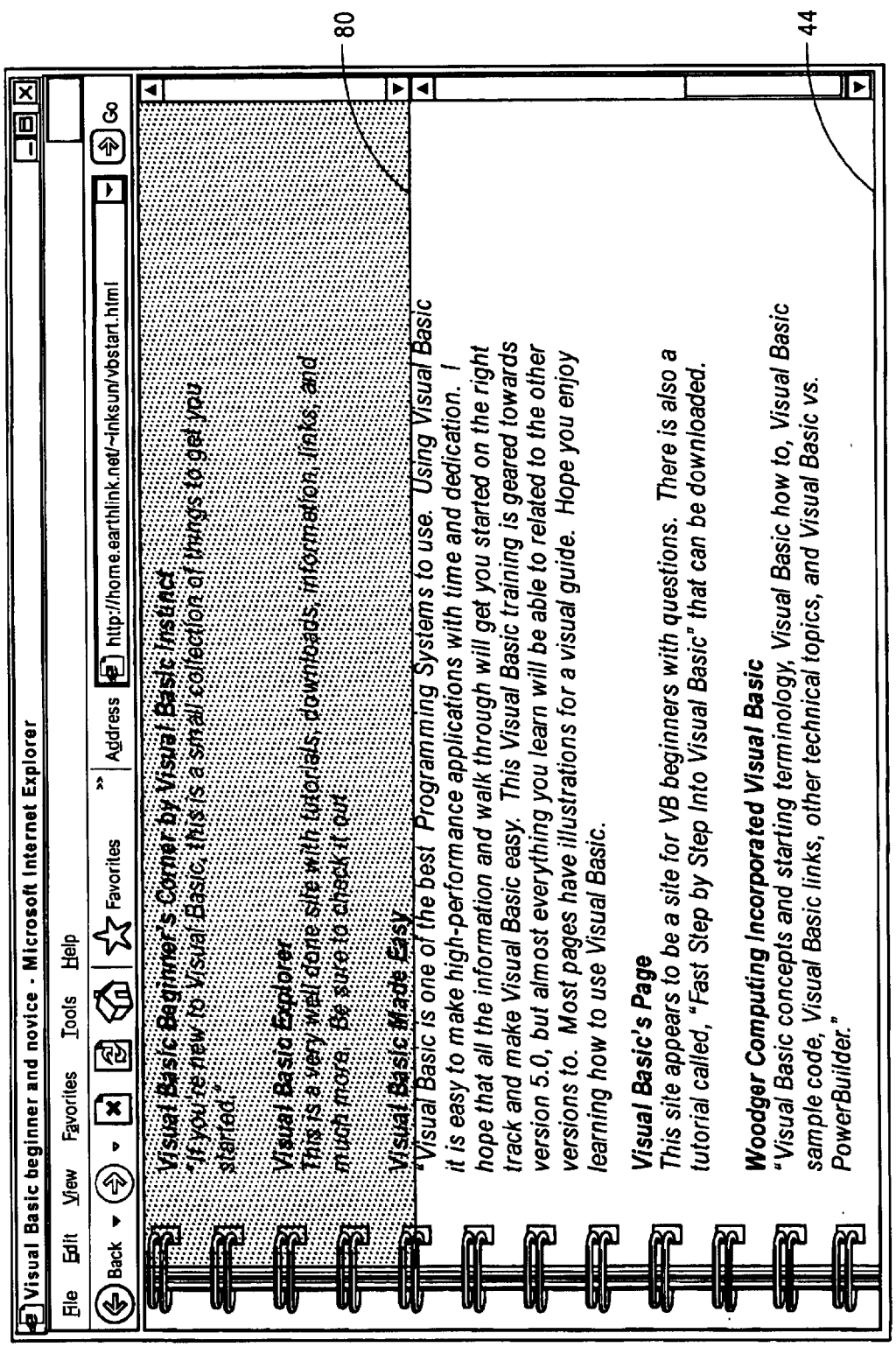

A user can then again click on the paging area, or the scroll bar, 56 to display a subsequent page 70 as shown in FIG. 3c (steps 5 and 2). Another grayed out mask 74 having a lower edge 76 is located over lines which have already been displayed on the page 60 in FIG. 3b. The process is again repeated as illustrated in FIG. 3d and FIG. 3e. Note that, in FIG. 3e, a final line of all the information is displayed near the lower edge 44. Fewer newly displayed lines are displayed, and more previously displayed lines. The lower edge of the mask is however located lower than in any one of FIGS. 3b, 3c, or 3d.

A user may also scroll in an opposing direction. The user may for example click on an area 80 to scroll up. A subsequent upper page will then have a lower portion that is grayed out to indicate lines already viewed.

The example illustrated in FIG. 3 is an example of a browser which displays multiple lines of text. FIG. 4 illustrates an example where multiple lines of file names are displayed in a window. As shown in FIG. 4b, a mask 100 is shown which distinguishes previously displayed lines of FIG. 4a from newly displayed lines. The embodiment of FIG. 4 is the same as the embodiment of FIG. 3 in all other respects.

Vertical paging is illustrated in FIGS. 3 and 4. The invention may also find application in an embodiment such as in FIG. 5. In FIG. 5a a page 150 of information is displayed including multiple vertical columns 152. Each column 152 includes a plurality of file names listed below one another. By clicking on a horizontal paging area, or scroll bar, 154 to the right of a horizontal slider bar 156, a subsequent page 160 can be displayed. The page 160 includes some of the columns 152, and a few additional columns 162 which are newly displayed. The columns 152 are moved relative to their position on the page 150 in a horizontal direction to the left. A grayed out mask 164 is located over the columns 152. A right edge 166 of the grayed out mask 164 is located between one of the columns 152 located furthest to the right and one of the columns 162 located furthest to the left. FIG. 5 illustrates that the invention can be applied to distinguish the lines from one another, whether they are located in rows below one another, or in columns located side by side. Such rows or columns may also be in the form of a spreadsheet application. The invention applies to horizontal paging even if there is only one column of information to be displayed, portion of the column on an initial page and adding another portion of the column on a next page.

Although the invention has been described with reference to applications residing on a personal computer, the invention may also find application in other computers, such as laptop computers, handheld computers, electronic data displayed on television displays, or mobile telephones. Other devices may also occur to one skilled in the art.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A method of displaying information on a display area of a screen of an electronic device, comprising:
   (i) displaying an initial page of information on the display area;
   (ii) repeatedly transmitting a signal from a user interface device operated by a user;
   (iii) in response to each signal displaying a subsequent page of the information on the display area, including a previously displayed line or lines on a previous page but moved a distance away from an edge of the display area, and a newly displayed line or lines between the previously displayed line or lines and the edge; and
   (iv) automatically upon display of each subsequent page displaying a visual cue on the display area the distance away from the edge in a manner to enable a user to distinguish the previously displayed line or lines from the newly displayed line or lines.

2. The method of claim 1, wherein the visual cue is always displayed at the distance away from the edge.

3. The method of claim 1 wherein the edge is a horizontal lower edge, the lines are horizontal lines of text, and the previously displayed line or lines are moved upwardly away from the edge.

4. The method of claim 1 wherein the edge is a vertical right edge, the lines are vertical columns of text, and a first column or columns are moved horizontally to the left.

5. The method of claim 1 wherein an area over the previously displayed line or lines has a first pattern and an area over the newly displayed line or lines has a second pattern which is different from the first pattern, there being a transition between the previously displayed line or lines and the newly displayed line or lines from the first pattern to the second pattern.

6. The method of claim 5 wherein the first pattern is a grayed-out pattern.

7. The method of claim 1 wherein the visual cue is removed after a discrete amount of time.

8. A method of displaying information on a display area of a screen of an electronic device, comprising:
   (i) displaying an initial page of the information on the display area, including a first line or lines having a first line adjacent a first edge of the display area and a final line distant from the first edge, and a second line or lines having a first line adjacent the final line of the first line or lines and a final line adjacent a second edge of the display and opposing the first edge;
   (ii) transmitting a signal from a user interface device operated by a user;
   (iii) in response to the signal displaying a subsequent page of the information on the display area including the second line or lines which are moved relative to their position on the initial page in a paging direction away from the second edge towards the first edge so that the first line thereof is adjacent the first edge and the final line thereof is distant from the second edge, and a third line or lines having a first line adjacent the final line of the second line or lines; and
   (iv) automatically when the subsequent page is displayed, displaying a visual cue on the display area between the second line or lines and the third line or lines in a manner to enable a user to distinguish the third line or lines from the second line or lines.

9. The method of claim 8 wherein an area over the second line or lines has a first pattern and an area over the third line or lines has a second pattern which is different from the first pattern; there being a transition between the second line or lines and the third line or lines from the first pattern to the second pattern.

10. The method of claim 9 wherein the first pattern is a grayed-out pattern.

11. A computer-readable medium having stored thereon a list of instructions which, when executed by a processor of a computer displays information on a display area of the computer by:
    (i) displaying an initial page of information on the display area;
    (ii) repeatedly receiving a signal from, a user interface device operated by a user;
    (iii) in response to each signal displaying a subsequent page of the information on the display area, including a previously displayed line or lines on a previous page but moved away a distance from an edge of the display area, and a newly displayed line or lines between the previously displayed line or lines and the edge; and
    (iv) automatically upon display of each subsequent page displaying a visual cue on the display area the distance away from the edge a manner to enable a user to distinguish the previously displayed line or lines from the newly displayed line or lines.

12. The computer-readable medium of claim 11, wherein the visual cue is always displayed at the distance away from the edge.

13. The computer-readable medium of claim 11 wherein the edge is a horizontal lower edge, the lines are horizontal lines of text, and the previously displayed line or lines are moved upwardly away from the edge.

14. The computer-readable medium of claim 11 wherein the edge is a vertical right edge, the lines are vertical columns of text, and a first column or columns are moved horizontally to the left.

15. The computer-readable medium of claim 11 wherein an area over the previously displayed lines has a first pattern and an area over the newly displayed lines has a second pattern which is different from the first pattern, there being a transition between the previously displayed lines and the newly displayed lines from the first pattern to the second pattern.

16. The computer-readable medium of claim 15 wherein the first pattern is a grayed-out pattern.

17. A computer-readable medium having stored thereon a list of instructions which, when executed by a processor of a computer displays information on a display area of the computer by:
   (i) displaying an initial page of the information on the display area, including a first line or lines having a first line adjacent a first edge of the display area and a final line distant from the first edge, and a second line or lines having a first line adjacent the final line of the first line or lines and a final line adjacent a second edge of the display and opposing the first edge;
   (ii) transmitting a signal from a user interface device operated by a user;
   (iii) in response to the signal displaying a subsequent page of the information on the display area including the second line or lines which are moved relative to their position on the initial page in a paging direction away from the second edge towards the first edge so that the first line thereof is adjacent the first edge and the final line thereof is distant from the second edge, and a third line or lines having a first line adjacent the final line of the second line or lines; and
   (iv) automatically when the subsequent page is displayed, displaying a visual cue on the display area between the second line or lines and the third line or lines in a manner to enable a user to distinguish the third line or lines from the second line or lines.

18. The computer-readable medium of claim 17 wherein an area over the second line or lines has a first pattern and an area over the third line or lines has a second pattern which is different from the first pattern, there being a transition between the second line or lines and the third line or lines from the first pattern to the second pattern.

19. The computer-readable medium of claim 17 wherein the first pattern is a grayed-out pattern.

20. A method of displaying information on a-display area of a screen of an electronic device, comprising:
   (i) displaying a scroll bar having a slider on the display area;
   (ii) displaying an initial page of information in a window on the display area;
   (iii) transmitting a signal from a user interface device operated by a user;
   (iv) in response to the signal displaying a subsequent page of the information in the window, including a previously displayed line or lines on a previous page but moved away from an edge of the display area, and a newly displayed line or lines between the previously displayed line or lines and the edge and moving the slider within the scroll bar; and
   (v) automatically upon display of the subsequent page displaying a visual cue on the display area in a manner to enable a user to distinguish the previously displayed line or lines from the newly displayed line or lines, the visual cue not only being on the scroll bar.

21. The method of claim 20, further comprising repeating (iii), (iv), and (v).

22. The method of claim 20, wherein the edge is a horizontal lower edge, the lines are horizontal lines of text, and the previously displayed line or lines are moved upwardly away from the edge.

23. The method of claim 20, wherein the edge is a vertical right edge, the lines are vertical columns of text, and a first column or columns are moved horizontally to the left.

24. The method of claim 20, wherein an area over the previously displayed line or lines has a first pattern and an area over the newly displayed line or lines has a second pattern which is different from the first pattern, there being a transition between the previously displayed line or lines and the newly displayed line or lines from the first pattern to the second pattern.

25. The method of claim 24, wherein the first pattern is a grayed-out pattern.

26. The method of claim 20, wherein the visual cue is removed after a discrete amount of time.

27. A computer-readable medium having stored thereon a list of instructions which, when executed by a processor of a computer displays information on a display area of the computer by:
   (i) displaying a scroll bar having a slider on the display area;
   (ii) displaying an initial page of information in a window on the display area;
   (iii) receiving a signal from a user interface device operated by a user;
   (iv) in response to the signal displaying a subsequent page of the information in the window, including a previously displayed line or lines on a previous page but moved away from an edge of the display area, and a newly displayed line or lines between the previously displayed line or lines and the edge and moving the slider within the scroll bar; and
   (v) automatically upon display of the subsequent page displaying a visual cue on the display area in a manner to enable a user to distinguish the previously displayed line or lines from the newly displayed line or lines, the visual cue not only being on the scroll bar.

28. The computer-readable medium of claim 27, further comprising:
   repeating (iii), (iv), and (v).

29. The computer-readable medium of claim 27, wherein the edge is a horizontal lower edge, the lines are horizontal lines of text, and the previously displayed line or lines are moved upwardly away from the edge.

30. The computer-readable medium of claim 27, wherein the edge is a vertical right edge, the lines are vertical columns of text, and a first column or columns are moved horizontally to the left.

31. The computer-readable medium of claim 27, wherein an area over the previously displayed lines has a first pattern and an area over the newly displayed lines has a second pattern which is different from the first pattern, there being a transition between the previously displayed lines and the newly displayed lines from the first pattern to the second pattern.

32. The computer-readable medium of claim 31, wherein the first pattern is a grayed-out pattern.

* * * * *